(12) United States Patent
Ruschin et al.

(10) Patent No.: US 10,635,722 B2
(45) Date of Patent: Apr. 28, 2020

(54) METHOD OF DISTRIBUTED MANAGEMENT OF ELECTRONIC DOCUMENTS OF TITLE (EDT) AND SYSTEM THEREOF

(71) Applicants: OGY DOCS, INC., Wilmington, DE (US); Gad Ruschin, Tel Aviv (IL); Or Garbash, Zufim (IL); Yair Sappir, Tel Aviv (IL)

(72) Inventors: Gad Ruschin, Tel Aviv (IL); Or Garbash, Zufim (IL); Yair Sappir, Tel Aviv (IL)

(73) Assignee: OGY DOCS, INC.DE (US)

( * ) Notice: Subject to any disclaimer, the term of this patent is extended or adjusted under 35 U.S.C. 154(b) by 71 days.

(21) Appl. No.: 15/567,615

(22) PCT Filed: Apr. 20, 2016

(86) PCT No.: PCT/IL2016/050420
§ 371 (c)(1),
(2) Date: Oct. 19, 2017

(87) PCT Pub. No.: WO2016/170538
PCT Pub. Date: Oct. 27, 2016

(65) Prior Publication Data
US 2018/0075028 A1     Mar. 15, 2018

Related U.S. Application Data

(60) Provisional application No. 62/149,896, filed on Apr. 20, 2015.

(51) Int. Cl.
*G06F 16/93* (2019.01)
*G06F 16/27* (2019.01)
(Continued)

(52) U.S. Cl.
CPC .............. *G06F 16/93* (2019.01); *G06F 16/27* (2019.01); *G06F 21/6218* (2013.01); *G06F 21/64* (2013.01); *G06Q 10/00* (2013.01)

(58) Field of Classification Search
USPC ......................................................... 707/695
See application file for complete search history.

(56) References Cited

U.S. PATENT DOCUMENTS

| 2001/0016838 A1 | 8/2001 | Landrock |
| 2002/0095308 A1 | 7/2002 | Pragelas |

(Continued)

FOREIGN PATENT DOCUMENTS

| WO | WO 2010/056936 | 5/2010 |

OTHER PUBLICATIONS

International Search Report of Application No. PCT/IL2016/050420 dated Jul. 1, 2016.

*Primary Examiner* — Kim T Nguyen
(74) *Attorney, Agent, or Firm* — Pearl Cohen Zedek Latzer Baratz LLP

(57) ABSTRACT

There are provided decentralized system and method of managing electronic documents of title (EDTs). The method comprises: by an issuing node: generating a root unique object (RUO) associated with the issuing node and usable as a pointer to a blockchain maintained in the DTDB, thereby initiating for a given EDT a possession chain characterized by ID associated with the RUO (RUOID); and embedding into the given EDT a data object informative of the RUOID, and digitally signing the EDT with the embedded data object in a manner enabling an authorized holding node to verify the EDT and to extract the data object, thereby giving rise to a generated EDT; by each holding node currently being in possession of the generated EDT: transferring possession of the generated EDT to a recipient holding node being the next node to become in possession of the generated EDT, the (Continued)

transferring possession comprises: obtaining from the blockchain a first unique object generated by a holding node which has transferred EDT possession to the first holding node; using the first unique object to generate a second unique object which is indicative of the first unique object, specifies the recipient holding node and is includable in the blockchain; enabling including the generated next unique object into the blockchain; and forwarding the generated EDT to the recipient holding node via a digital media; by each holding node, responsive to receiving possession of the generated EDT: validating the received generated EDT; using RUO_ID embedded in the generated EDT to validate possession chain; and transferring possession of the generated EDT to recipient holding node.

17 Claims, 10 Drawing Sheets

(51) Int. Cl.
*G06Q 10/00* (2012.01)
*G06F 21/62* (2013.01)
*G06F 21/64* (2013.01)

(56) References Cited

U.S. PATENT DOCUMENTS

| | | |
|---|---|---|
| 2003/0115039 A1* | 6/2003 | Wang ............... G06F 17/271 704/4 |
| 2004/0111619 A1 | 6/2004 | Laurie et al. |
| 2005/0240483 A1 | 10/2005 | Shinobu et al. |
| 2006/0153082 A1 | 7/2006 | Lee |
| 2008/0235043 A1 | 9/2008 | Goulandris et al. |
| 2009/0125425 A1 | 5/2009 | Kloostra et al. |
| 2010/0146047 A1 | 6/2010 | Grieder et al. |
| 2010/0146385 A1 | 6/2010 | Goulandris |
| 2011/0029433 A1 | 2/2011 | Thoo |
| 2012/0096503 A1* | 4/2012 | Slothouber ........ H04N 21/4126 725/110 |
| 2012/0109830 A1 | 5/2012 | Vogel |
| 2014/0095519 A1* | 4/2014 | Liu ............... G06F 16/8373 707/755 |
| 2015/0019204 A1* | 1/2015 | Simard ............. G06F 17/2785 704/9 |
| 2018/0075028 A1* | 3/2018 | Ruschin ............. G06Q 10/00 |
| 2018/0268081 A1* | 9/2018 | Kearney ............. H04L 41/069 |

* cited by examiner

METHOD OF DISTRIBUTED MANAGEMENT OF ELECTRONIC DOCUMENTS OF TITLE (EDT) AND SYSTEM THEREOF

CROSS-REFERENCE TO RELATED APPLICATIONS

This application is a National Phase Application of PCT International Application No. PCT/IL2016/050420, International Filing Date Apr. 20, 2016, claiming the benefit of U.S. Patent Application No. 62/149,896, filed Apr. 20, 2015, which are hereby incorporated by reference.

BACKGROUND

Nowadays business is going digital and companies are set to reap huge benefits, avoiding lengthy delays while papers get physically checked, stamped and transported between parties. Electronically preparing, exchanging and tracking business documents removes the complexities and inefficiencies of paper-based, labour intensive processes associated with paper-based transactions.

Traditionally, the paper method has been seen as the safest way to confirm that goods and payment have changed hands. Accordingly, for business to go digital, people need assurance that business documents cannot be forged.

Validity of electronic documents' content can be assured by various solutions known in the conventional art which enable digitally signing and verifying electronic documents. For example, when a digital signature is employed to sign a document, the signer can first identify exactly what is being signed. The content identified by the signer is hashed to generate a hash result that is essentially unique to the content of the document. Then, the hash result is converted into a digital signature using a private key of the signer to encrypt the hash result. In this manner, both the document and the private key are related to the digital signature. Optionally, the digital signatures can be embedded in the electronic document. In order to verify a digital signature, a verifier needs to have access to the public key (or representation thereof) of the signer in order to decrypt the hash result that was encrypted with the private key of the signer.

In addition to assurance of content's validity, some documents (e.g. certificates of origin, medical prescriptions, invoices, etc.) require assurance of uniqueness, i.e. preventing the document's replication. Documents of title (e.g. bills of lading, bank guarantees, promissory notes, bank cheques, car licenses, etc.) further require evidence of ownership, whilst negotiable documents of title also require that the current owner of the negotiable document of title is able to identify himself as the owner and to prove the ownership over the negotiable document of title.

For purpose of illustration only, the following description is provided for an electronic bill of lading (eB/L), one of the most prevalent documents of title. Those versed in the art will readily appreciate that, likewise, the disclosed subject matter can be applied to other, negotiable and nonnegotiable electronic documents of title (EDT) usable for transferring title.

Bill of Lading (B/L) typically has three functions, namely: 1) it is a receipt, i.e. an acknowledgment by the carrier that the goods have been loaded and comprises a description of the shipment (e.g. it identifies the shipper, receiver, pick up point/port and delivery point/port and describes the goods, for example, the quantity and quality of the goods and any remarks by the ship's captain about damage); 2) it outlines the terms of the contract of carriage; and 3) it constitutes title of the goods, the title is transferable when the Bill of Lading is negotiable. B/L may either be made out in a negotiable or a nonnegotiable form. Many efforts have been made to bring into existence EDT that would replicate all the functions of their paper counterparts and that would be acceptable for traders, bankers, secured lenders, carriers, freight forwarders, etc. The problems of managing EDT have been recognized in the Prior Art and various systems have been developed to provide a solution, for example:

US Patent Application No. 2001/016838 discloses a method of issuing an electronic negotiable document (END) comprising: creating as data an END and storing this in a tamper-resistant document carrier, the document carrier containing a unique public-secret key pair for signing and verifying a unique document carrier identifier; signing the unique document-carrier identifier, the END and an END identifier using the secret key of the public-secret key pair and storing the result in the document carrier.

US Patent Application No. 2002/095308 discloses a central server that facilitates and tracks shipping transactions, such as transactions in which a sending party or source organization wishes to have a shipment of goods transported to a delivery site or destination organization using a carrier. The source party wishing to ship goods may initiate a transaction. The various documents which need to be created in a shipping transaction (e.g., a bill of lading ("BOL") or proof of delivery ("POD") document) may be created and stored at the central server, which allows one or more of the parties to the transaction to view the documents as the status of the transaction changes. The vehicle transporting the shipment may be tracked by, for example, a global positioning system ("GPS") system, and the location of the vehicle, before or after picking up the goods, may be tracked by one or more of the parties.

US Patent Application No. 2004/111619 discloses a system for securely vaulting, auditing, controlling and transferring electronic transferable records (IRs) with unique ownership, including at least one registry for registering the electronic transferable record with unique ownership in a TR registry record; at least one secure storage manager (SSM) associated with the registry, the SSM storing the transferable record registered in the registry as an authoritative copy, the secure storage manager being distinct from said registry. The transferable record can be transferred in a transaction between an originating party and a receiving party with a transaction descriptor including information about the parties involved in the transaction and an identification of the TR being transferred. The transaction descriptor is initially signed by the originating party with the TR, subsequently verified and countersigned by the registry and signed by said accepting party. The transaction descriptor, upon completion of the transaction, is stored in the TR registry record and se Flies to identify the authoritative copy of the TR.

US Patent Application No. 2005/240483 discloses a document managing system includes a document receiving section for receiving document, a document item database for storing a correspondence between the document data and bill of lading (B/L) data, a B/L creating section for creating B/L data according to the document data and the document item database. The document managing system also includes a letter of credit (L/C) storage for storing L/C data, a document storage for storing the document data and the B/L data, a document data collation database for storing a correspondence between the L/C data and the document data, a negotiation request receiving section for receiving negotiation request data for a document bill to which an identifier of the document data is set, and a document collating section for collating, according to the document collation database, the document data indicated by an identifier set to the negotiation request data with the L/C data.

US Patent Application No. 2008/235043 discloses a distributed system for communicating messages between registered users of the system, each registered user communicating with the system via a user terminal, the messages relating to an original electronic document that is stored on the system and associated with one of the user terminals, the system comprising a plurality of registries, each registry having a mutual trust relationship with each of the other registries and each registry being associated with one or more user terminals; wherein each registry is connectable to a data communications network, and comprises a processing means arranged to validate the eligibility of each of its registered users' user terminals to send or receive a message relating to the stored electronic document, the processing means further being arranged to notarize a message sent from or received by the user terminal of one of its one or more registered users, the notarization indicating the validity of the message relating to the stored document.

US Patent Application No. 2009/125425 discloses a method for auditable tracking of a shipment. The method includes providing instructions for execution on a server and for execution on a mobile device. The instructions for execution on the server include at least one code segment configured to: receive a request from a shipper to ship a plurality of goods, receive logistics information from a logistics company in response to the request from the shipper, receive from the shipper a bill of lading (BOL), and receive from the logistics company data identifying a quantity of the plurality of goods that was delivered. The instructions for execution on the mobile device include at least one code segment configured to: enable a user to edit the BOL responsive to an inspection by the user of the delivered plurality of goods, and provide the edited BOL to the server, the shipper, and the logistics company.

US Patent Application No. 2010/146385 discloses a method of amending an electronic document in a distributed electronic document system, the electronic document being associated with a current holder (H) who has a right of control over the document and a first party, the method of amending the electronic document comprising the steps of holder H raising an amendment request which details the amendments required to the electronic document; sending the amendment request from H to the first party via the electronic document system for approval; updating the electronic document with the amendments detailed in the amendment request if the first party approves the amendment request, and transmitting the updated electronic document to current holder H wherein the method further comprises maintaining the right of control over the electronic document with H until the first party approves the amendment request.

US Patent Application No. 2010/146047 discloses a technique of the automated, community-based exchange of procurement documents. In some of embodiments, there may be different sets of rules for each of a number of different communities of trading partners. Each set of rules may be made up of rules data for the automated exchange of procurement documents in respective communities. By way of example, a host trading partner may select the rules for exchange of procurement documents for a community. Invited trading partners may register for the community, and rules for the community may then be distributed to the registered trading partners.

US Patent Application No. 2011/029433 discloses an import/export facility; said facility including computer implemented software resident on servers and databases maintained by a Central Control Facility; said software providing for registration of Importers and Exporters and at least one Bank in each country of operation of registered said Importers and Exporters; said registration effected by accessing Internet web pages generated and transmitted by said software; said at least one Bank registering on behalf of a said registered Importer, a Hybrid Bank Guarantee with said Central Control Facility; a registered Exporter registering with said Central Control Facility an invoice against said Hybrid Bank Guarantee for a transaction with a said registered Importer, and wherein said software executes steps to monitor registered invoices against said Hybrid Bank Guarantee; said steps including: (e) adding the value of an invoice submitted for registration to a sum of values of invoices (if any) prior registered against said Hybrid Bank Guarantee to derive a total value, (b) comparing said derived total value to the value of said registered Hybrid Bank Guarantee against which said invoice was submitted for registration, (c) registering said invoice against said registered Hybrid Bank Guarantee of the registered Importer to whom said invoice is directed if said total value does not exceed the value of said Hybrid Bank Guarantee, (d) maintaining registration of a said invoice for a period nominated by a said registered Exporter on payment of a registration fee, and wherein said computer system rejects for registration any invoice submitted for registration by a said Exporter against a said Hybrid Bank Guarantee if said derived total value is greater than the value of said Hybrid Bank Guarantee; said computer system generating, and causing to be transmitted, email advice of rejection to said Exporter and to said Importer; and wherein said Exporter may claim against said Hybrid Bank Guarantee if payment of a registered invoice is not made by said Importer within a nominated registration period of said invoice.

The references cited in the background teach many principles of managing EDT that are applicable to the presently disclosed subject matter. Therefore the full contents of these publications are incorporated by reference herein where appropriate for appropriate teachings of additional or alternative details, features and/or technical background.

General Description

In accordance with certain aspects of the presently disclosed subject matter, there is provided a method of managing electronic documents of title (EDTs) in a decentralized system comprising a plurality of processor-based holding nodes connected to each other in a peer-to-peer fashion and each maintaining a local copy of at least one decentralized transaction database (DTDB) shared by the holding nodes. DTDB can be shared merely by holding nodes comprised in the decentralized system. Alternatively, DTDB can be shared by holding nodes comprised in the decentralized system and by other nodes.

The method comprises:
- by an issuing node, generating a root unique object (RUO) associated with the issuing node and usable as a pointer to a blockchain maintained in the DTDB, thereby initiating for a given EDT a possession chain characterized by ID associated with the RUO (RUOID);
- by the issuing node, embedding into the given EDT a data object informative of the RUOID, and digitally signing, the EDT with the embedded data object in a manner enabling an authorized holding node to verify the EDT and to extract the data object, thereby giving rise to a generated EDT;

by each holding node currently being in possession of the generated EDT, transferring possession of the generated EDT to a recipient holding node being the next node to become in possession of the generated EDT, the transferring possession comprises: obtaining from the blockchain a first unique object generated by a holding node which has transferred EDT possession to the first holding node; using the first unique object to generate a second unique object which is indicative of the first unique object, specifies the recipient holding node and is includable in the blockchain; enabling including the generated next unique object into the blockchain; and forwarding the generated EDT to the recipient holding node via a digital media;

by each holding node, responsive to receiving possession of the generated EDT: validating the received generated EDT; using RUO_ID embedded in the generated EDT to validate possession chain; and transferring possession of the generated EDT to recipient holding node.

By way of non-limiting example, the issuing node can generate the root unique object by sending a token to itself, thereby generating a root transaction associated with the issuing node.

Optionally, the unique object generated by holding node when transferring EDT possession can be a possession transaction with an input referring to the previous possession transaction in the possession chain and with an output indicative of address of recipient holding node. Enabling including the generated next unique object into the blockchain can comprise broadcasting a message informative of the possession transaction to all nodes sharing DTDB.

In accordance with further aspects of the presently disclosed subject matter and in possible combinations with other aspects, validating the possession chain can comprise extracting RUO_ID from the EDT and traversing the blockchain to identify, with the help of RUO_ID, the beginning of the possession chain. Optionally, a holding node traverses the blockchain responsive to receiving the generated EDT.

In accordance with further aspects of the presently disclosed subject matter and in possible combinations with other aspects, validating the possession chain can comprise querying, by a holding node, the blockchain for transactions associated with RUO_ID and searching within such transactions for indication of respective possessors of the given EDT.

In accordance with further aspects of the presently disclosed subject matter and in possible combinations with other aspects, the method can further comprise triggering by the issuing node an alert indicative of problems related to the given EDT.

In accordance with further aspects of the presently disclosed subject matter and in possible combinations with other aspects, the method can further comprise: by each holding node, prior to transferring possession of the generated EDT to a recipient holding node, obtaining and validating a signed random address (SRA) of the recipient holding node, and transferring possession in accordance with the obtained SRA. Each holding node can forward the generated EDT to the recipient holding node using a shared storage server, the shared storage server configured such that downloading a given EDT requires knowledge of public key associated with the given EDT, and uploading the given EDT requires proof of ownership of a pairing private key.

In accordance with further aspects of the presently disclosed subject matter and in possible combinations with other aspects, the method can further comprise transferring title specified in the given EDT, the transferring being bound to the possession chain. Optionally, each endorser holding node currently being associated with the current owner of title: generates and signs an endorsement object, the endorsement object informative of a ID of endorsee holding node associated with the next owner of title), adds the generated endorsement object to the generated EDT and signs the EDT together with the added endorsement object, thereby giving rise to an appended EDT; and transfers the appended EDT to the endorsee holding node through one or more next recipient holding nodes in the possession chain. Optionally, each endorser holding node, prior to generating and signing the endorsement object, can obtain and validate a signed random address (SRA) of the endorsee holding node, and generate the endorsement object using the obtained SRA.

In accordance with other aspects of the presently disclosed subject matter, there is provided a decentralized system capable of computerized managing electronic documents of title (EDTs), the system comprising a plurality of processor-based holding nodes connected to each other in a peer-to-peer fashion and each maintaining a local copy of at least one decentralized transaction database (DTDB) shared by the holding nodes, the system being configured to perform the method above.

In accordance with other aspects of the presently disclosed subject matter, there is provided a computer program product implemented on a non-transitory computer usable medium and comprising computer readable program code for performing the method above.

Among advantages of certain embodiments of the presently disclosed subject matter is enabling EDT to change hands whilst ensuring uniqueness of EDT itself and, the title thereof. Management of EDT transferring can be provided with no need of involvement of a trusted third party, or, optionally, with third party involved, merely, in trusted management of cryptographic keys.

BRIEF DESCRIPTION OF THE DRAWINGS

In order to understand the invention and to see how it can be carried out in practice, embodiments will be described, by way of non-limiting examples, with reference to the accompanying drawings, in which.

DETAILED DESCRIPTION

Figure 1A:
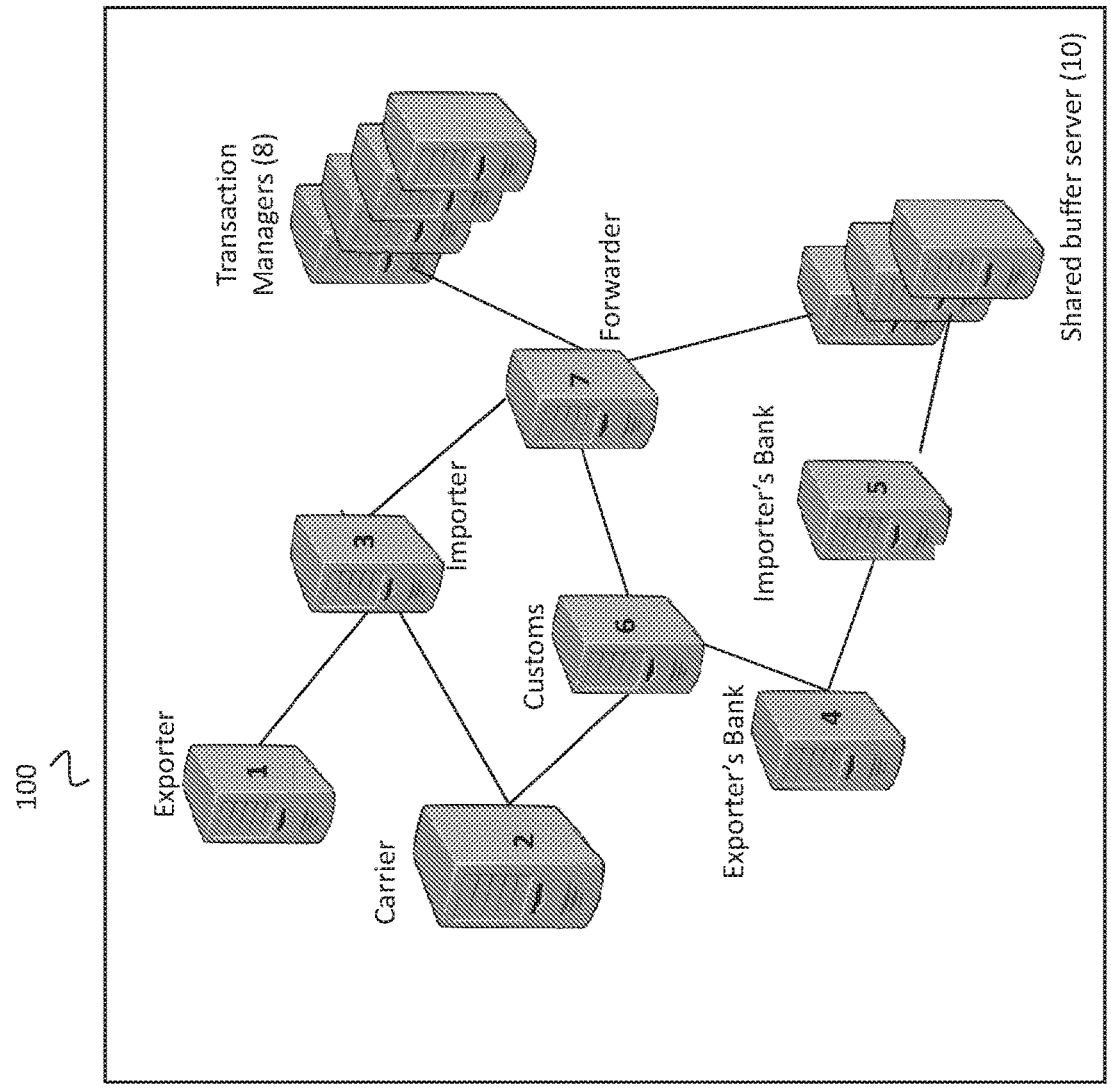
FIGS. 1a and 1b illustrate functional block diagrams of decentralized document management system (DDMS) in accordance with certain embodiments of the presently disclosed subject matter.

In the following detailed description, numerous specific details are set forth in order to provide a thorough understanding of the invention. However, it will be understood by those skilled in the art that the presently disclosed subject matter can be practiced without these specific details. In other instances, well-known methods, procedures, components and circuits have not been described in detail so as not to obscure the presently disclosed subject matter. In the drawings and descriptions, identical reference numerals indicate those components that are common to different embodiments or configurations.

Unless specifically stated otherwise, as apparent from the following discussions, it is appreciated that throughout the specification discussions utilizing terms such as "processing", traversing generating "verifying", "validating", "issuing", "signing", "endorsing", "publishing", "sending", "receiving", "triggering", "transferring", or the like, refer to the action(s) and/or process(es) of a computer that manipulate and/or transform data into other data, said data represented as physical, such as electronic, quantities and/or said data representing the physical objects. The term "computer" should be expansively construed to cover any kind of hardware-based electronic device with data processing capabilities including, by way of non-limiting example, DDMS and parts thereof disclosed in the present application.

The terms "non-transitory memory" and "non-transitory storage medium" used herein should be expansively construed to cover any volatile or non-volatile computer memory suitable to the presently disclosed subject matter.

Embodiments of the presently disclosed subject matter are not described with reference to any particular programming language. It will be appreciated that a variety of programming languages can be used to implement the teachings of the inventions as described herein.

Bearing the above in mind, attention is drawn to FIG. 1*a* illustrating a decentralized distributed system 100 configured in accordance with certain embodiments of the presently disclosed subject matter and capable of managing electronic documents of title (EDTs) changing hands between different involved entities (e.g. exporters, importers, carriers, forwarders, banks, etc.). Electronic transferring possession of a document from a node associated with one entity to a node associated with another entity is referred to hereinafter as "transferring of possession".

The decentralized distributed system (referred to hereinafter as a decentralized document management system. DDMS) 100 comprises a plurality of nodes (illustrated as nodes 1-7) operatively connected in a peer-to-peer fashion without a central server and/or central entity, while each node is reachable from another node directly or via some path that goes through one or more other nodes. Nodes 1-7 are associated with entities being senders and/or addressees in transferring EDTs (such nodes are referred to hereinafter as holding nodes or holders).

Figure 7:
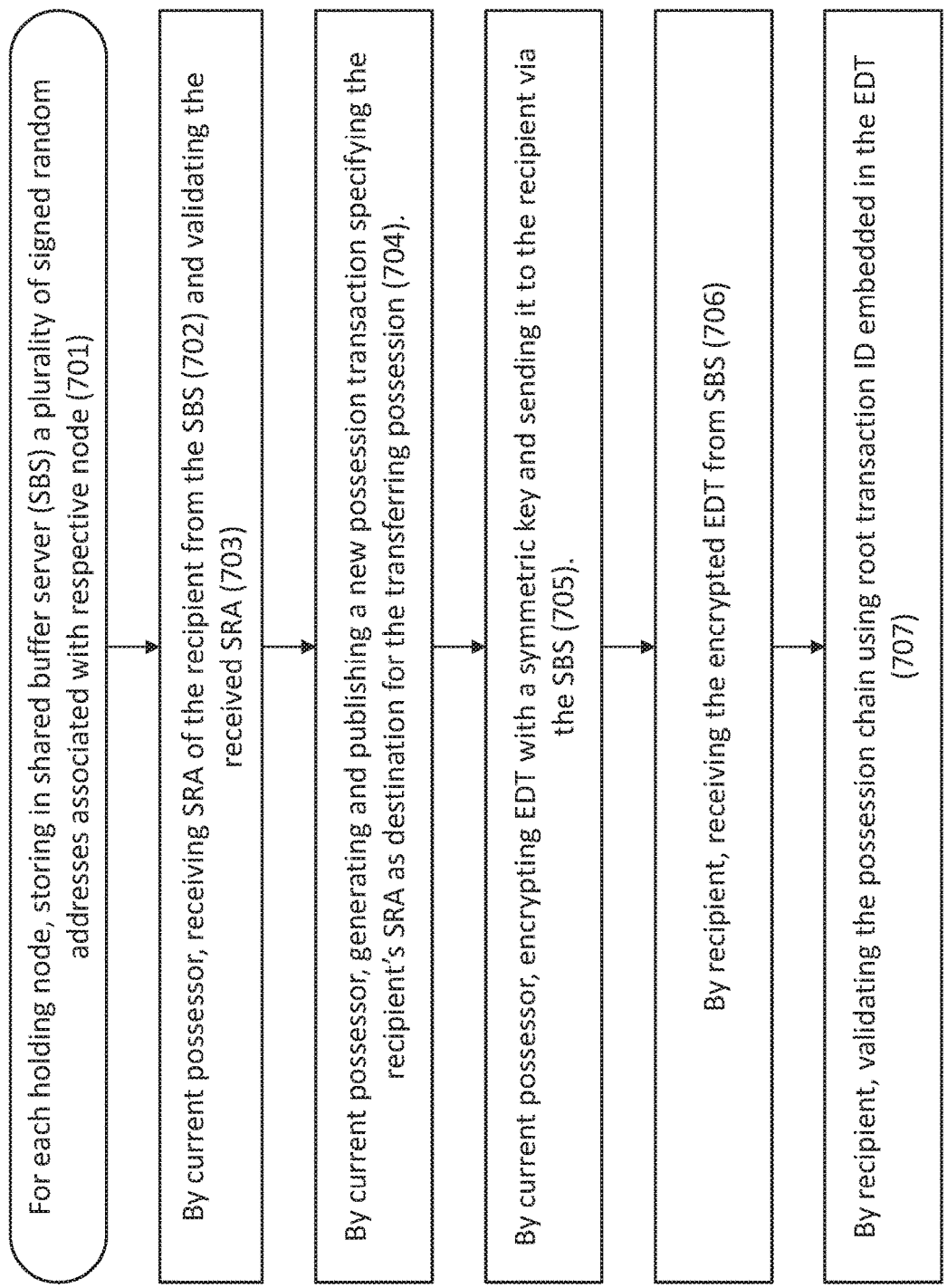
FIG. 7 illustrates a generalized flow chart of transferring possession of EDT in accordance with certain embodiments of the presently disclosed subject matter, the embodiments including using signed random addresses.

Optionally, DDMS can further comprise one or more shared buffer server 10 (comprising one or more operatively coupled servers and operating in a centralized or decentralized manner) operatively connected (directly or indirectly) with all holding nodes and configured to operate as further detailed with reference to FIGS. 7-8.

As will be further detailed with reference to FIGS. 2-8, DDMS is configured to implement a blockchain technology as an underlying tool for establishing consensus between the nodes with no need for any node to establish dedicated trust with a peer node (directly or indirectly through a third party). Blockchain technology is implemented in the art for managing ownership of crypto-currency through public key cryptography along with consensus algorithm for keeping track of the crypto-currency ownership. It is noted that in the following description the term "crypto-currency" should be expansively construed to cover a digital currency or other assets in which cryptographic techniques are used to regulate their generation and transfer. In accordance with certain embodiments of the presently disclosed subject matter, DDMS is configured to use the blockchain technology to enable the decentralized consensus with regard to validity of possession and title of EDTs.

Optionally, DDMS can be configured to maintain its own one or more blockchains. In such a case DDMS can further comprise one or more transaction managing nodes 8 (referred to hereinafter also as transaction managers (TMs)) operatively coupled with holding nodes and configured to enable, based on blockchain technology, decentralized consensus on possession/title validity. For purpose of illustration only, transaction managers in DDMS in FIG. 1*a* are implemented on nodes other than holding nodes. Those versed in the art will readily appreciate that, likewise, the disclosed subject matter is applicable to DDMS comprising one or more holding nodes operating, also, as transaction managers. It is noted that, optionally, DDMS can comprise only holding nodes wherein at least part of them operates as transaction managers. It is also noted that in certain embodiment, transaction management can be provided by only predefined nodes, while in another embodiments any node can operate as a transaction manager.

Further, for purpose of illustration only, the following description refers to DDMS system implementing a single blockchain. Those versed in the art will readily appreciate that, likewise, the disclosed subject matter is applicable to DDMS comprising a plurality of blockchains (e.g. each carrier or a group thereof can be associated with a dedicated blockchain). In such a case, DDMS can include several groups of TMs, each group operating, merely, with regard to respective blockchain. Alternatively, a part or all transaction managers can operate with several blockchains and be configured to identify, for each transaction, a relevant blockchain and to operate accordingly.

Nodes in the DDMS can be connected via Internet or any other appropriate communication media.

Each node in DDMS comprises at least one processor and a memory resource. Processor of each holding node is configured to run a DDMS agent enabling further detailed with reference to FIGS. 2-9 operation of the node. It is noted that, unless the context dictates the contrary, an action provided by a holding node can be provided with or with no involvement of a human input.

Figure 1B:
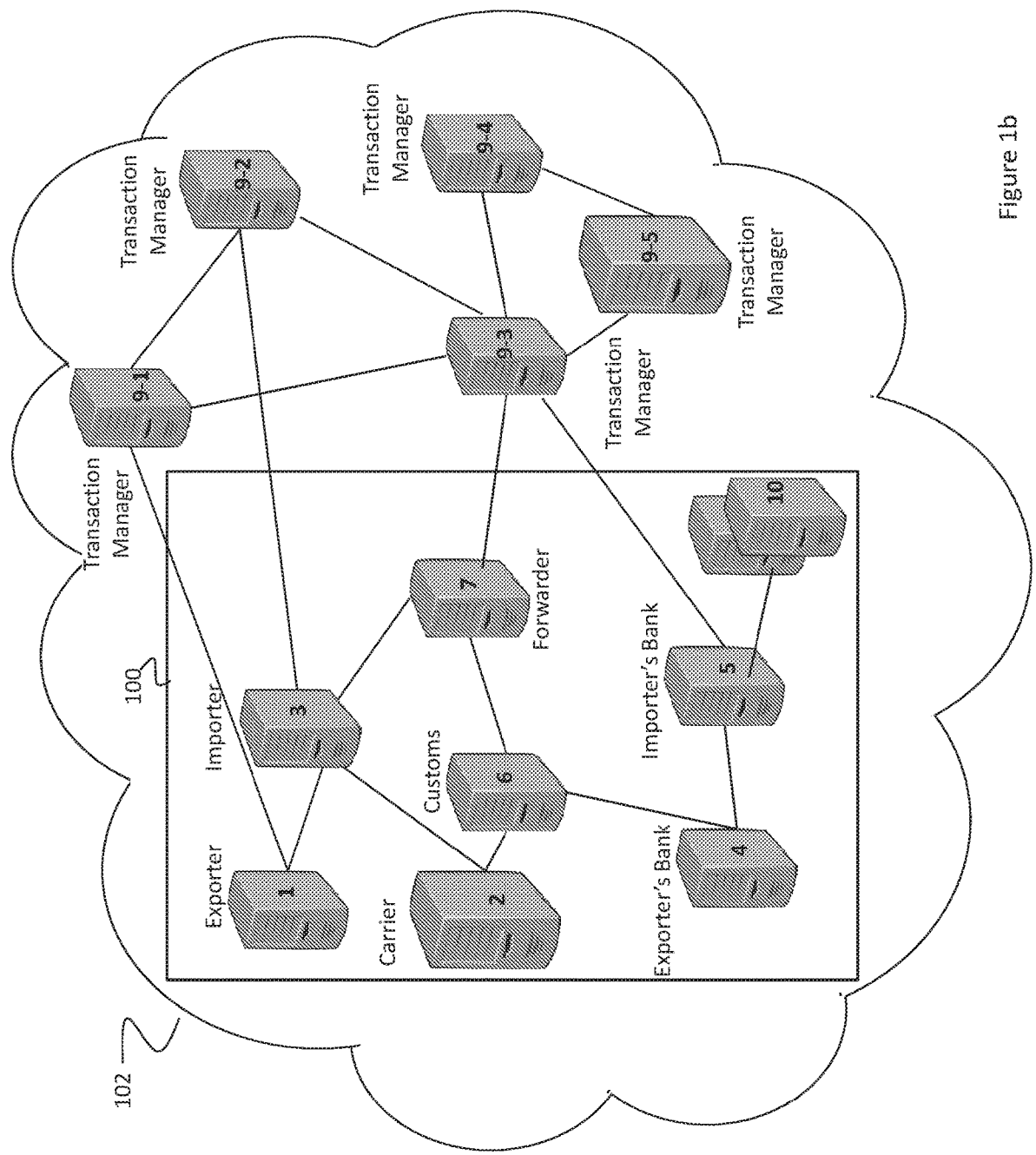

Alternatively, as illustrated in FIG. 1*b*, DDMS can be configured to operate on top of an existing blockchain-based network 102 (e.g. Bitcoin, Ethereum, BigchainDB or other crypto-currency networks, etc.) and make use (alternatively or additionally to TMs 8) of decentralized consensus on transactions validity enabled by transaction managers (miners) 9-1-9-5 of the network 102. Network 102 further comprises other nodes (not shown) not belonging to DDMS and also making use of the decentralized consensus enabled by the respective blockchain.

For purpose of illustration only, the following description is made for blockchain comprising transaction records. Those versed in the art will readily appreciate that, likewise, the disclosed subject matter is applicable to blockchain comprising blocks of other unique records (e.g. contracts used in Ethereum).

Unless the context dictates the contrary, in the following description any node (belonging or not belonging to DDMS) generating the blocks in a blockchain is referred to hereinafter as a transaction manager any node making use of the provided consensus on transactions validity is referred to hereinafter as a network node. It is noted that in a case of DDMS with dedicated blockchain (e.g. as illustrated in FIG. 1*a*), all network nodes belong to DDMS; while in a case of DDMS operating on top of non-dedicated blockchain (e.g. as illustrated in FIG. 1*b*), network nodes other than holding nodes (and having no DDMS agents) are not part of DDMS.

Each network node is configured to possess at least one pair of private/public key associated therewith. Further, network nodes are configured to own tokens representative of transferable items and associated with private/public keys of respective nodes. Tokens are created along with the creation of the network; alternatively or additionally, they can be created as a reward during network operation (e.g. for the TMs) and/or created "on the fly" in accordance with other predefined rules.

Network nodes are further configured to transfer tokens to destination network nodes in accordance with respective destination addresses. Transferring a token from a sending network node to a receiving node is recorded in at least one transaction register, such a record being referred to hereinafter as a transaction record (TR). A transaction record comprises data indicative of transferring a given transferable item from an owner of the given item to the address corresponding to the destination node, such transferring provided along with a digital signature created using a private key associated with the owner's public key. Each TR has a unique ID (e.g. the hash of the TR). Each TR comprises an input indicative of ID of a previous TR and an output indicative of a destination address of the current transaction, thus chaining the token transferring with the previous transaction.

By way of non-limiting example, a transaction record can describe a transfer of virtual currency, as, for example, in Bitcoin, Ethereum and other crypto-currency networks. It is noted that in the following description the term "token" should be expansively construed to cover also several tokens transferred together. In accordance with certain embodiments of the presently disclosed subject matter, as further detailed with reference to FIGS. 2-8, tokens transferred by holding nodes are representative of EDTs associated with respective tokens. In a case of DDMS operating on top of a crypto-currency network, a transfer, nominally, of crypto-currency token can represent an EDT transfer.

The network nodes are configured to broadcast over the network messages informative of the transaction records. For example, a network node transferring an item can send the respective message to each network node that it is connected to, while each connected network node can further relay the received message to every other node that it is connected to. The network nodes (or part thereof) are further configured to operate as transaction managers and produce packages of transaction records, such packages referred to hereinafter as block or transaction record groups (TRGs). Each TRG comprises a timestamp, a nonce, a reference to a previous block (e.g. hash of the previous block) and a list of all transactions that have taken place since the previous block. Each TR in a newly created TRG is validated against all previous IRs included in all previous TRGs in the blockchain. Suchwise created blockchain comprises TRGs placed in chronological order and links each TRG to a previous TRG in chronological order. Consequently, any network node can traverse the TRGs in the blockchain in reverse chronological order to verify transactions listed therein.

Each newly created TRG in the blockchain can comprise the hash of the previous TRG (except the very first TRG which can be hard coded into the node's software). Accordingly, changing a TRG at a certain location in the blockchain requires changing all of the following TRGs, since the changed TRG would have a different hash.

The blockchain is handled in the transaction register which can be implemented as a decentralized transaction database (DTDB) shared by all network nodes, and respective parts of the database can be accommodated in the memory resources of the network nodes.

Transaction records (IRs) are gathered into transaction record groups by transaction managers, each TM configured to generate a transaction record group independently of other TMs. TMs are responsible for creating new TRGs in accordance with a protocol defined for the network. In a case of DDMS operating on top of network 102, records of possession transactions and endorsing transactions (if any) between holding nodes can be packed in the groups comprising also other transaction records provided in the network. Subject to conditions defined for the network 102, any network node can operate as a transaction manager.

TMs are further configured to broadcast the newly created TRGs over the network such that all network nodes receive the newly created TRGs and store them into their local copies of DTDB upon local verification.

The integrity of network operation can be maintained by adherence of network nodes to established rules; such rules can be hard coded into the nodes.

By way of non-limiting example, in order to eliminate malicious actions (e.g. transferring the same token twice, changing TRs, etc . . . ), TMs can be configured to meet proof-of-work (PoW) requirement. PoW is a piece of data which is difficult (costly and\or time-consuming) to produce so as to satisfy certain requirements. Each TM is configured to generate PoW and include it in a newly generated TRG, thereby ensuring that enough efforts have been placed into the TRG's creation. By way of non-limiting example. PoW generation can include adding a certain nonce to the TRG contents such that the TRG's hash value would begin with a certain amount of zeros. A node receiving a newly created TRG can calculate the hash of the TRG and verify that the hash value begins with the agreed upon amount of zeros. The TM's effort in finding the relevant nonce can be rewarded (by providing fees, tokens, network preferences, etc.). PoW makes it hard for a TM to transfer the same token twice, since it would require him to perform PoW on two different TRG's.

Among rules to be adhered to by the network nodes can be a rule that in a fork the longest blockchain version is taken to be the truth. For example, broadcasting two conflicting TRGs would make a fork in the TRG chain (DTDB) creating two different possible versions of TRG chains (two different DTDBs) (in a first version tokens are sent from a first entity to a second entity, while in the second version tokens are sent from the same first entity to a third entity). In such a case, the malicious TM becomes in a race with all other TMs for creating the next TRG for both chain versions in the fork. Since each TM aggregates TRs in TRGs and calculates PoW independently of other TMs, the chance that the same TM would find the required nonce over and over again in a row decreases significantly. So, at some point one of the versions of the chains would become shorter than the other, and this is where the longest chain rule comes into place. Nodes will discard shorter versions and only accept the longest version of TRG chain. If so, in order to continue malicious behavior, the malicious TM would need to calculate both chain versions faster than all other TMs in the network calculating respective single versions.

Likewise, consensus can be reached also with a help of a Proof-of-Stake approach (e.g. used in networks like Peer-Coin, BlackCoin, NxT as currently operating) and requiring from TM to prove an ownership of certain crypto-currency amount in order that its blocks become accepted by the network, combination of PoW and PoS, etc., via voting procedure (e.g. as used in BigChainDB as currently operating), etc.

Figure 2:
FIG. 2 illustrates a non-limiting example of operating DDMS in accordance with certain embodiments of the presently disclosed subject matter.

Referring to FIG. 2, there is illustrated a generalized flow-chart of operating DDMS.

In accordance with certain embodiments of the presently disclosed subject matter, one or more of the holding nodes are configured to be capable of generating an EDT. Such nodes are referred to hereinafter as issuing nodes (or issuers) and can be associated with entities authorized to issue the respective EDTs. By way of non-limiting example, in a case of eB/L, the issuing nodes can be associated with carriers, freight forwarders, etc.

Figure 3:
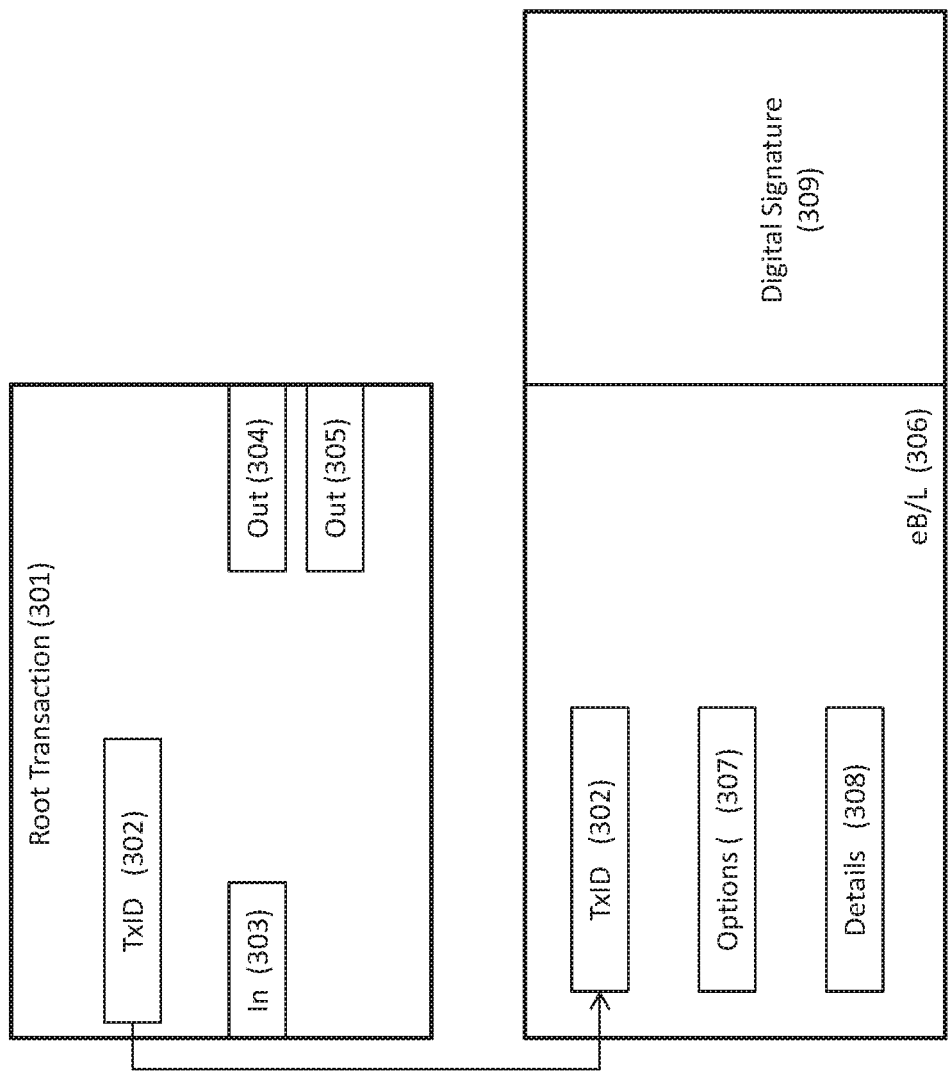
FIG. 3 illustrates non-limiting example of generating root unique object in accordance with certain embodiments of the presently disclosed subject matter.

The issuer generates a root transaction, thereby initiating (201) a possession chain, the root transaction declares that the issuing node is the initial possessor of EDT. The possession chain is informative of a chain of possessors duly and successively transferring possession of a given EDT from one holding node to another. The issuer further generates and signs (202) EDT associated with the initiated possession chain. A non-limiting example of generating the root transaction and EDT is illustrated in FIG. 3. The illustrated EDT is eB/L 306 generated by an issuing node when DDMS operates on top of Bitcoin network. The issuer initiates root transaction 301 characterized by a root transaction ID 302 and comprising a single input 303 and at least one output 304. The input 303 is configured to load the possession chain and to provide an issuer's token for initiating the transaction. The output 304 is configured to transfer the issuer's token to the issuer address. Optionally, as will be further detailed with reference to FIG. 6, the transaction can have a second output 305 configured to transfer the token to trigger an address in a case of an alert to be sent by the issuing node. The generated eB\L 306 comprises ID 302 of the root transaction, options 307 specified by the issuer in accordance with shipping requirements (e.g. whether the possession chain must pass through a consignee or not) and necessary details 308 of the shipping and goods. The era 306 further comprises digital signature 309 signing the eB/L content based on an asymmetric data signing algorithm. Thus, the issuing node sends a token it possesses (e.g. provided by a dedicated authority) to itself, thereby generating the root transaction associated therewith and initiating the possession chain.

Referring back to FIG. 2, the issuer further transfers possession of the created EDT to holding node being a first intermediate recipient. Transferring possession comprises generating (203) a possession transfer transaction (referred to hereinafter also as possession transaction). For example, the possession transaction can comprise one input referring to the root transaction's token to be used in this transaction and one output transferring the token to the address of the first intermediate recipient. The transferring further comprises forwarding (204) the signed EDT to the first intermediate recipient via an electronic communication (email, p2p, etc . . . ) and, along with forwarding EDT to the first intermediate recipient, broadcasting (205) to all network nodes a message informative of transaction record, thereby enabling TMs to insert the possession transaction record into the blockchain. The transferring of possession is considered to be completed (i.e. EDT possession is considered to be transferred to a next possessor) once the record of possession transaction has been entered in a block and the network nodes have achieved consensus with regard to validity of this block. Upon reception of the signed EDT, the first intermediate holding node checks (206-1) that EDT's content is correct and that it is signed properly by the issuer. The signature is validated using the trusted public key of the issuer.

Figure 4:
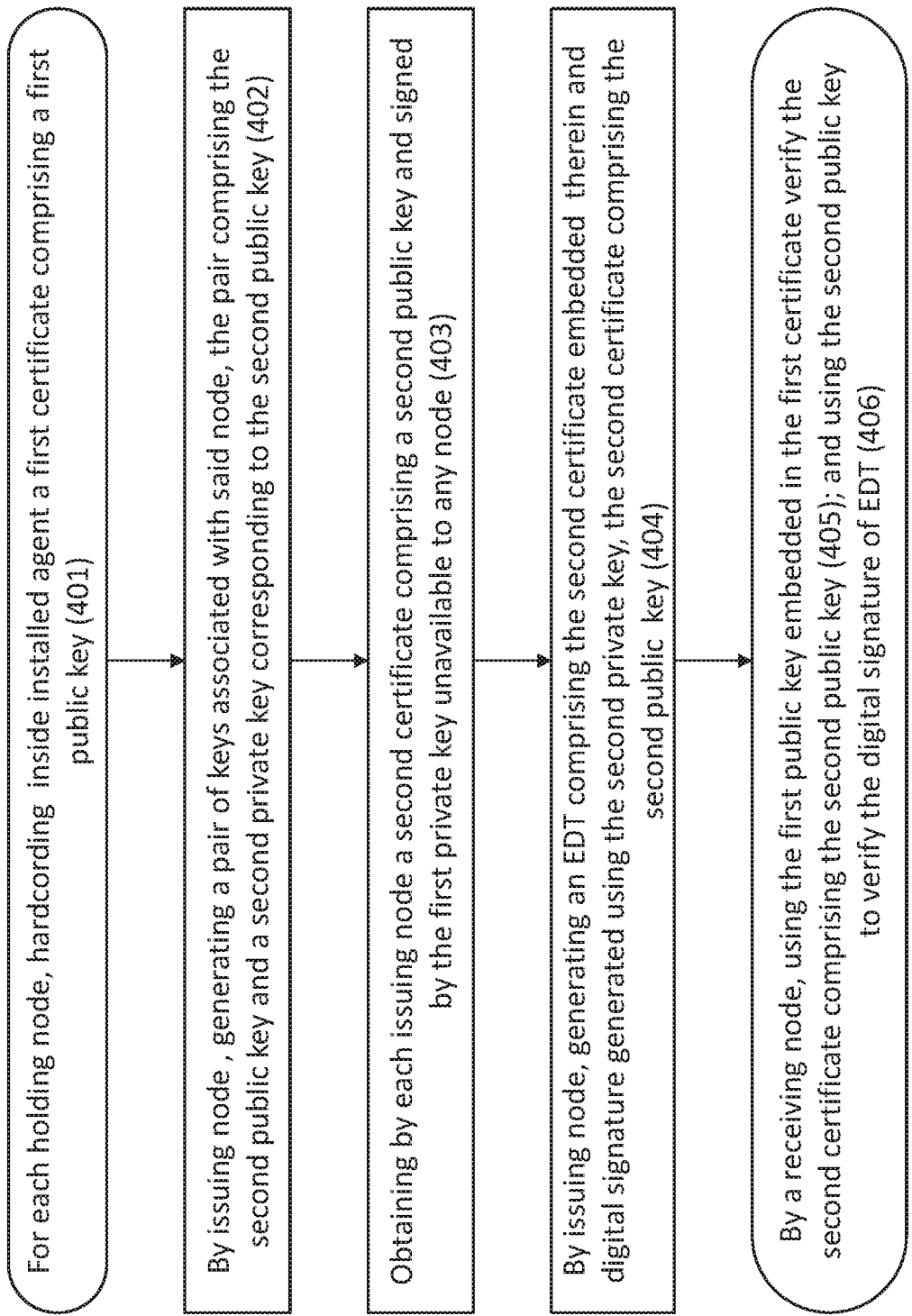
FIG. 4 illustrates cryptographic keys exchange in accordance with certain embodiments of the presently disclosed subject matter.
Figure 5:
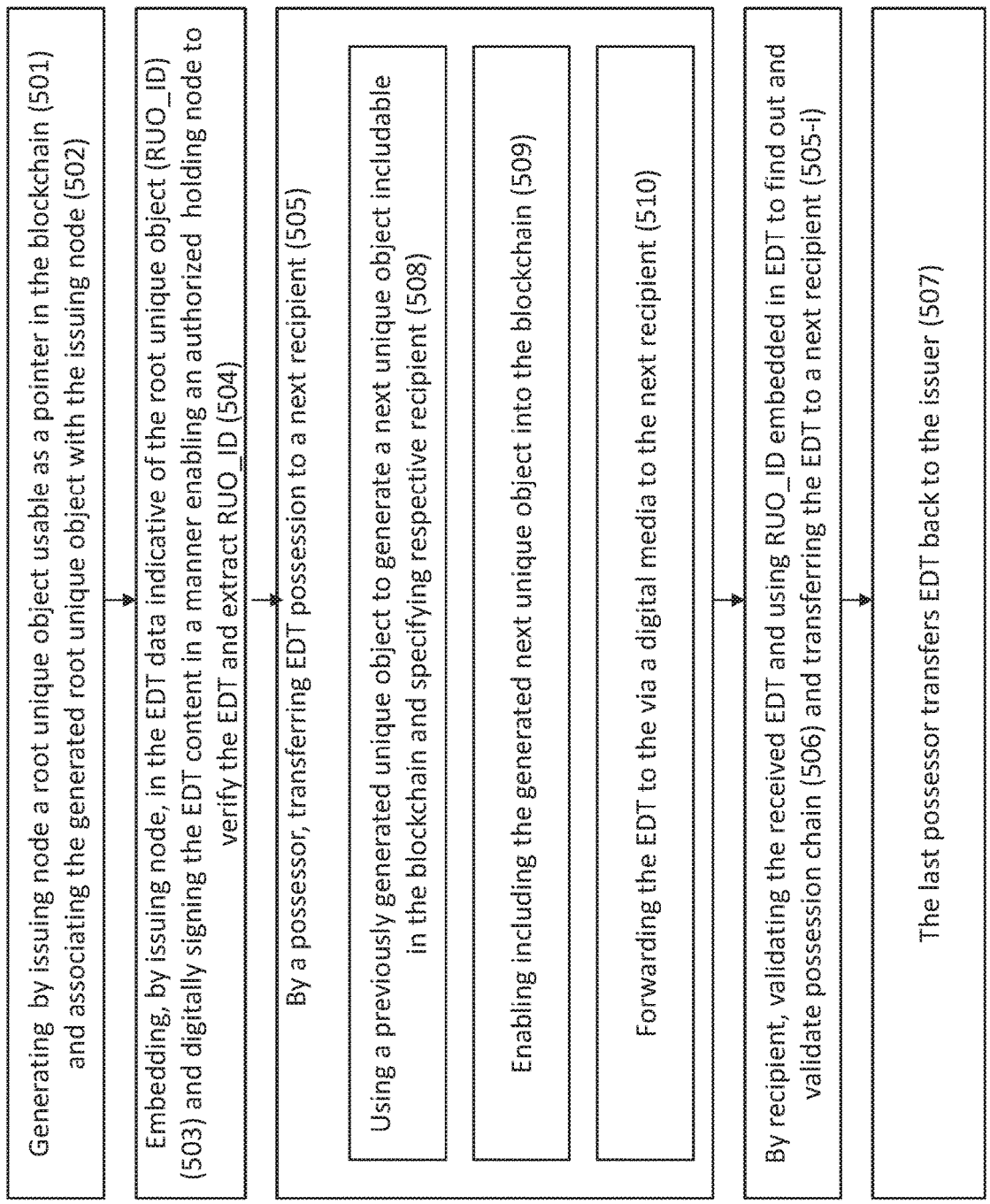
FIG. 5 illustrates a generalized flow chart of transferring possession of EDT in accordance with certain embodiments of the presently disclosed subject matter.

The issuer can send its trusted public key a signed certificate with the public key embedded therein) directly to the holding nodes (in push or pull mode) or can publish it on reliable media so that the key becomes accessible to the holding nodes. Optionally, the issuer's public key can be provided in a manner enabling issuer's verification as is illustrated in FIG. 4. In accordance with certain embodiments of the presently disclosed subject matter, the DDMS agent installed at each holding node can comprise a hard-coded (401) first (root) certificate issued by a trusted agency and comprising a first (root) public key. Each holding node is configured to generate private-public asymmetric key pair for signing purposes. Issuing node generates (402) a pair of keys associated therewith, the pair comprising a second public key and a second private key corresponding to the second public key. Each issuing node further obtains (403) a second certificate comprising a second public key and signed by a first (root) private key unavailable to any node. The second certificate can be generated by the trusted authority upon receiving the issuer's public key. An issuer generates (404) an EDT comprising a second certificate embedded therein and a digital signature generated using the second private key, and the second certificate comprising the second public key. Upon receiving the EDT, a holding node uses the root public key embedded in the root certificate to verify (405) that the second certificate has been signed by the root private key. The node further uses the second public key embedded in the second certificate to verify (406) the digital signature of EDT.

Referring back to FIG. 2, further to validating the received EDT, the first intermediate holding node validates (206-1) the possession chain and/or parts thereof. The holding node extracts the root transaction ID from the validated EDT and traverses the blockchain to identify the beginning of the possession chain. The holder checks whether it is specified as a current possessor, i.e. whether its address corresponds to the last possession transaction in the possession chain. The holder further checks that each possession transaction in the possession chain has been properly created and that the possession chain does not include an EDT possession transfer to the issuer. Invalid possession transactions will make the EDT's possession chain invalid.

Optionally, as will be further detailed with reference to FIG. 6, the holder can also check whether a warning has been alerted by the issuer.

Optionally, a holding node can traverse the blockchain responsive to receiving the EDT (via e-mail or other digital media). Once the EDT is received, the receiving node can use the root transaction ID embedded in the EDT as a pointer to the root transaction in the blockchain that starts the possession chain. From that point onward, the node can find each next transaction record referring to previous transaction record in the chain starting from the respective transaction. The last transaction record in the chain is indicative of the last possessor of the EDT.

Alternatively, a holding node can parse the blockchain responsive to adding a block to its local copy of blockchain. Thus, the holding node can generate, in ongoing manner, a data structure representative of the blockchain (e.g. directed graph). Once an EDT is received, the receiving node can use the root transaction ID embedded in the EDT as a pointer to the transaction in the built graph. From that point, the node can search the respective path onward to find the last possessor of the EDT. In such a case, the receiving node also checks if the possession chain does not include an EDT possession transfer to the issuer, while the proper creation of transaction records in the chain have been checked in an ongoing manner.

In both cases above, the holding node can query the blockchain for transactions associated with the root transaction ID and check within such transactions for indication of respective possessors of EDT. Indication of the possession within a transaction can be implemented in different manner depending on blockchain architecture and implemented protocols. By way of non-limiting example, when DDMS runs on top of Bitcoin-like network, such indication can be implemented in the transaction itself; while when DDMS runs on top of Ethereum-like network, such indication can be implemented within a contract comprised in a respective transaction (such contract although being created in a transaction, can act as an independent entity).

The first intermediate holding node further transfers the received EDT to the next intermediate holder. The transferring comprises generating (207) next possession transaction in possession chain, forwarding (208) EDT with embedded indication of possession chain to a next holder, and broadcasting message informative of transaction record to all network nodes (205-1). By way of non-limiting example, in a case of DDMS running on top of Bitcoin-like network, input of the new possession transaction can refer to the token in the last endorsing transaction in the possession chain which will be used in the new transaction; the output can transfer the token to the next holder.

Alternatively, transferring EDT possession can be provided as following: upon generating a possession transaction, a sending node sends the generated transaction to a receiving node via a digital media (p2p, e-mail, etc.), while the receiving node broadcasts the transaction record on the blockchain after receiving the EDT. The EDT possession is considered to be transferred once the record of possession transaction has been entered in a block, and the network nodes have achieved consensus with regard to the block validity.

Operations 206-208 are repeated by each next intermediate recipient. Each current possessor validates the received EDT and the possession chain. It is noted that operation of generating possession transaction addressed to a next recipient and operation of forwarding EDT thereto can be provided in any order and not coordinated in time.

The entity associated with the last holder in the possession chain is the only entity that is allowed to receive the goods or equivalents thereof. Thus, upon validating (206-n) the received EDT and possession chain, the last holder of EDT transfers (209) the EDT back to the issuer. In order to prove the possession of EDT and claim the goods, the last generates (210) a Proof of Possession. Optionally, proof of possession can be issued also by any other node when necessary (e.g. for forensic purposes).

The Proof of Possession is usable for proving association of an entity associated with a respective holding node and representation of this entity in the blockchain. To create the Proof of Possession, the entity associated with the node possessing EDT generates a digital signature on some data (e.g. EDT, random/static data, etc.) using a private key that pairs to public key used in the possession chain for transferring possession to this node. Such signature provides cryptographic proof that the respective entity owns the pairing key and, indeed is associated with the node appeared in the blockchain and being possessor of EDT.

A generated EDT can specify the first entity to own the title (consignee). If EDT is generated as negotiable document, the consignee can further pass the title to a next entity. Optionally, if consignee is not defined explicitly in the negotiable EDT, a possessor of the EDT can be the owner of the title. Specifying (implicitly or explicitly) the first consignee in the generated EDT sets up the beginning of the endorsement chain informative of transferring title associated with EDT. In accordance with certain embodiments of the presently disclosed subject matter, in order to prevent the endorser from endorsing the same EDT to several nodes, the transfer of title can be bound to the possession chain. When transferring title, a holding node associated with the current owner of title (such node is referred to hereinafter as endorser) generates and signs endorsement object, the endorsement object informative of a public key (token or other appropriate ID) of endorsee (a holding node associated with the next owner of title). The endorser further adds the generated endorsement object to the EDT and signs the EDT together with the added endorsement object. Likewise, each next endorsee adds to EDT a respectively generated endorsement object and signs the EDT together with the added endorsement object and with endorsement object added by previous endorsees. Thereby the appended EDT comprises data informative of the entire endorsement chain, while this data is protected against any changes related to already the already provided transfers of title.

The endorser further uses the possession chain to transfer the appended EDT to a next possessor of the EDT. When specified endorsee becomes a possessor of EDT, it validates title of the received EDT. The validation comprises: checking that the EDT is valid and signed by a verified issuer; checking that information in the endorsement object is valid; checking that appended EDT has been signed by the endorser; and checking duly transferred possession and its correlation with endorsement chain. In the same manner, the endorsee further checks the entire endorsement chain Optionally, endorser can embed the hash of appended EDT into possession transfer transaction (e.g. in a case of Bitcoin-like blockchain) or into a contract (e.g. in a case of Ethereum the blockchain) such that the contract enforces a rile specifying that an endorser is enabled to transfer the title only when it is the current possessor of the EDT. Optionally, in some blockchains, the endorsement chain can be embedded in the blockchain (e.g. in a contract in Ethereum-like blockchain). In such a case the endorsement chain can be embedded in an encrypted form, visible only to the nodes that have been endorsed.

It is noted that operating DDMS is not limited by details disclosed with reference to FIG. 2. Likewise, as illustrated with reference to FIG. 5, the disclosed subject matter is applicable to any unique object (transaction record, contract, etc.) includable in a blockchain. Upon generating (501) a root unique object usable as a pointer to the blockchain and associating (502) the generated root unique object with the issuing node, the issuing node embeds (503) in the EDT data indicative of the root unique object (RUO_ID) and digitally signs (504) the EDT content in a manner enabling an authorized holding node to verify the EDT (e.g. to check that EDT content is not modified and that the entity who signed the EDT has proper certificate or otherwise provided trusted public key) and to extract RUO_ID. The issuing node transfers (505) the generated EDT to a next holder, the next holder validates (506) the received EDT and uses RUO_ID embedded in EDT to find out and validate possession chain and transfers (505-i) the EDT to a next holding node. The last possessor in the chain transfers (507) EDT back to the issuer. Transferring possession of EDT by each possessor comprises: using a previously generated unique object to generate (508) a next unique object includable (directly or indirectly) in the blockchain and specifying respective next recipient, enabling including (509) the generated next unique object into the blockchain and forwarding (510) the EDT to respective next recipient via a digital media.

Root unique object can be generated in different manner depending on blockchain architecture and implemented protocols. By way of non-limiting example, in Bitcoin-like networks the issuer can generate the root unique object by sending a token to itself, thus generating a root transaction and marking the starting point of the possession chain. By way of another non-limiting example, in Ethereum-like network the issuer can also generate the root unique object by generating a root contract by generating respective transaction. By way of yet another non-limiting example, in BigChainDB-like networks no tokens required for generating the unique object as consensus is reached via federation. In such networks the issuer generates a unique asset usable for marking the starting point of the possession chain.

Figure 6:
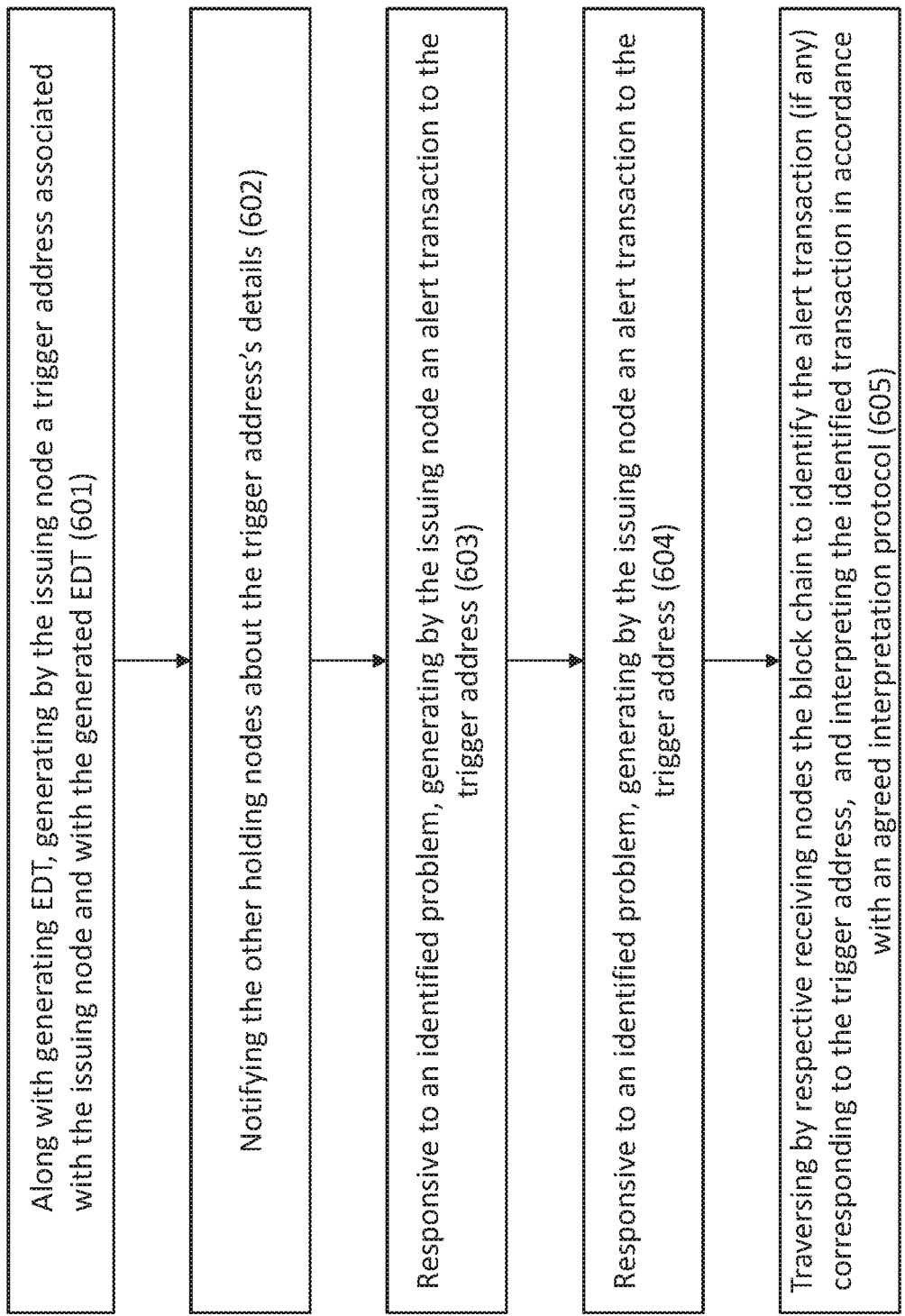
FIG. 6 illustrates a generalized flow chart of alerting process in accordance with certain embodiments of the presently disclosed subject matter.

Referring to FIG. 6, there is illustrated a generalized flow chart of alerting process. In the illustrated example the DDMS runs on top of Bitcoin-like network. In accordance with certain embodiments of the presently disclosed subject matter, issuing node, along with generating EDT, can generate (601) a trigger address associated with the issuer and with the generated EDT, and notify (602) the other holding nodes about the trigger address. As illustrated with reference to FIG. 3, output 305 of the root transaction can be used for sending token to the trigger address and for associating the trigger address with the respective EDT.

In a case when issuer identifies a problem related to the EDT, the issuer can generate (603) an alerting transaction and send it to the trigger address. By way of non-limiting example in a case of eB/L, the issuer can generate the alerting transaction if advised that consignee or shipper no longer have the private key associated with the public key associated with a current owner of the EDT. By way of another non-limiting example in a case of eB/L, the issuer can generate the alerting transaction if notified about problems with physical shipment corresponding to EDT. All holding nodes in DDMS (including the issuer) share an agreed protocol interpreting different transaction details (e.g. value of token, number of inputs/outputs in the alert transaction, etc.) to different issues related to EDT. Along with validating EDT and the possession chain, each receiving holding node can traverse the blockchain to find (604) an alerting transaction (if any) by the trigger address and interpret it in accordance with the agreed interpretation protocol. Optionally, a holding node can constantly monitor the blockchain with regard to the trigger addresses to check whether it has been notified. In a case when alert is found, the node can notify the associated entity and/or predefined other entities which can take respective business actions.

Triggering process can be implemented in different manners depending on blockchain architecture and implemented protocols. For example, in a case of DDMS running on top of Ethereum network, contract can be configured to comprise a data element changeable merely by issuer, such data element can be used as a flag (e.g. Boolean flag or actual data) informative of an alert, while triggering the flag can be a part of the contract. In a case of DDMS running on top of BigChainDB network triggering can be implemented in a manner similar to the detailed above with reference to Bitcoin, while the issuer can generate a separate transaction (instead of using the second output as for Bitcoin), this second transaction can be linked to the EDT either by referencing to it in the EDT itself, or by referencing to it in the payload of the root transaction.

As detailed above, each transfer of possession is recorded in a transaction which is published on the blockchain network, the transaction informative of transferring possession from a current possessor to the next possessor. There can be a need to prevent extracting Business intelligence from the blockchain (e.g. the number of eB/Ls issued by a certain carrier, the number of eB/Ls processed by a certain bank, etc.).

In accordance with certain embodiments of the currently presented subject matter, anonymity of the possession chain can be enabled with the help of a shared buffer server 10 (comprising one or more severs) operatively coupled to all holding nodes. The shared buffer server is configured to maintain for each authenticated holding node a personalized plurality of Signed Random Addresses (SRA). Each holding node can be configured to generate a plurality of SRAs belonging to the node and to provide them to the shared buffer server (SBS). As illustrated with reference to FIG. 7, upon authentication of the node, SBS can store (701) the received plurality of SRAs in association with the node (e.g. with the node's RSA public key) in a node-dedicated directory. The authentication process includes verifying that the entity sending the SRAs has a possession of the Private Key used to sign the SRAs.

Before transferring EDT to a recipient (a receiving holding node), a current possessor (holding node known in the blockchain as currently possessing EDT) provides recipient's details to SBS and receives (702), in response, SRA associated with the recipient. The current possessor uses recipients' RSA public key to validate (703) that the SRA was signed with the recipient's RSA Private Key, and also, that it was signed with the recipient's SRA Private Key. Validation of SRA private key can be provided by using random address corresponding to the respective SRA (e.g. using known technique disclosed in http://www.secg.org/sec1-v2.pdf incorporated herewith by reference).

Upon validating SRA, the current possessor generates and publishes (704) a new possession transaction. The possession chain is generated in a manner similar to the detailed with reference to FIGS. 2-5, however, for the transferring possession, the current possessor specifies in the transaction the recipient's random address corresponding to recipient's SRA (instead of permanent address as in the embodiments detailed with reference to FIGS. 2-5). As the current possessor has also received the possession using its SRA, the possession transaction record comprises two random addresses which no one, other than the current possessor and its recipient, can associate with specific nodes (and respective entities).

The current possessor further encrypts EDT with a newly generated symmetric key. The symmetric key is further encrypted with an RSA key. The current possessor further sends (705) the encrypted EDT to the recipient via SBS. Public Key of the recipient and the encrypted symmetric key are attached to the encrypted EDT. Thus, the recipient will be able to decrypt the encrypted symmetric key, and then decrypt the EDT. When sending the EDT through SBS, the current possessor associates the EDT with the recipient's RSA public key. In order to receive the encrypted EDT from SBS, the recipient is required to prove that it is the holder of Private Key pairing with RSA public key associated with respective node-dedicated directory. Upon such authentication, the recipient receives (706) the encrypted EDT from SBS. Likewise in the process detailed with reference to FIGS. 2-5, the recipient further validates (707) the possession chain using root transaction ID embedded in the EDT. The process is repeated by each intermediate possessor, while the last possessor transfers the EDT possession back to the issuer using the issuer's SRA. The issuer's SRA can be embedded in the EDT, or can be retrieved it via the SBS, using the issuers public key obtained from the certificate embedded in the EDT.

It is noted that any appropriate cryptography is applicable instead of RSA keys. It is further noted that the teaching of the currently presented subject matter are not bound by SBS and can be, likewise, applicable to any appropriate technique of data storage requiring knowledge of public key associated with a data object in order to download the data object, and requiring proof of ownership of a pairing private key in order to upload the data object for storage.

Figure 8:
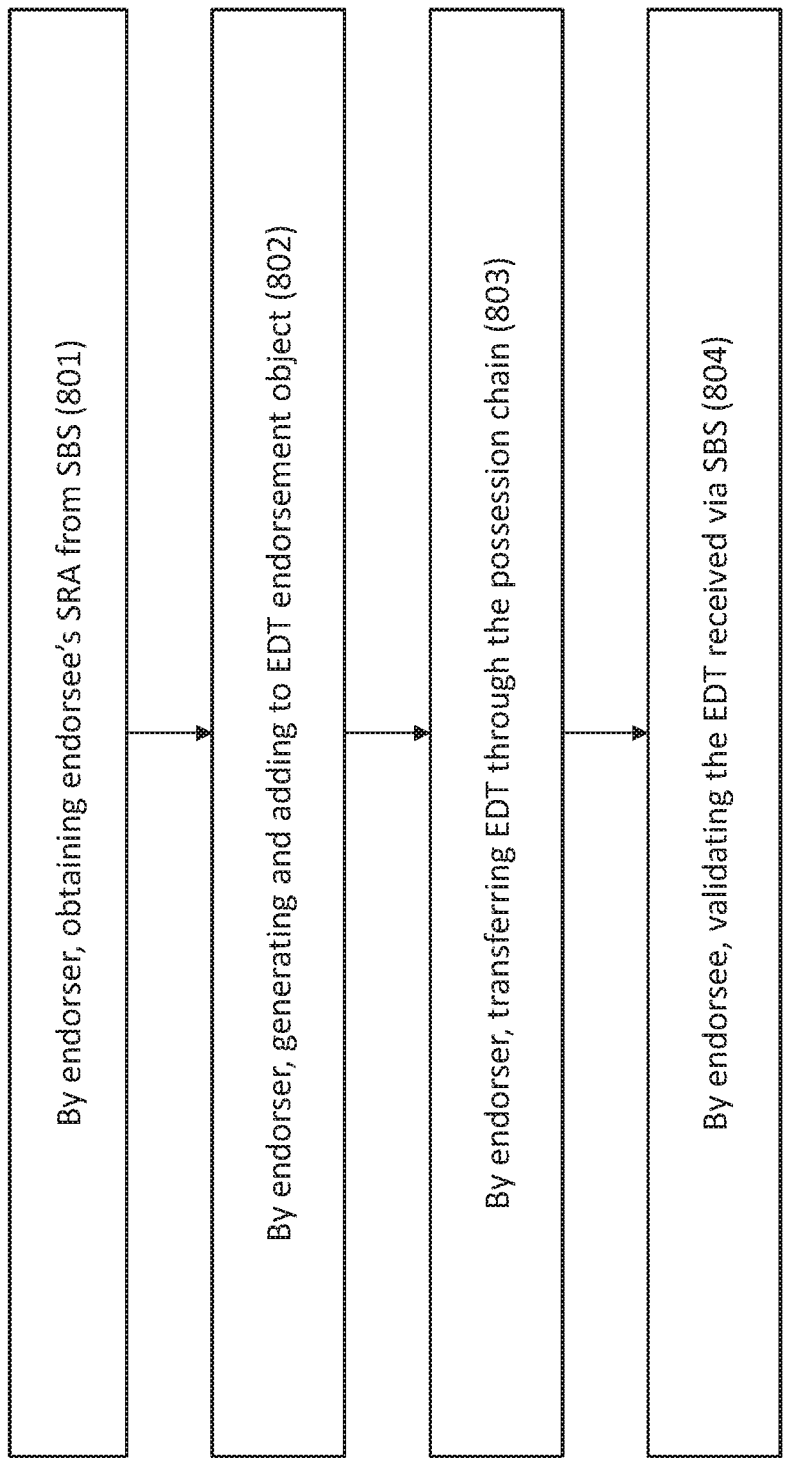
FIG. 8 illustrates a generalized flow chart of transferring title of EDT in accordance with certain embodiments of the presently disclosed subject matter, the embodiments including using signed random addresses.

Referring to FIG. 8, there is illustrated a process of transferring title, the process comprising using signed random addresses. In accordance with certain embodiments of the presently disclosed subject matter, when transferring a title (endorsing an EDT), an endorser obtains (801) endorsee's SRA from SBS, and generates and adds (802) to EDT an endorsement object associated with the current endorsement. The endorsement object comprises: a) SPA of the endorsee used (when the endorsement is being verified) thereby connecting between the random blockchain address and the RSA Public Key associated with the endorsee; b) endorsee contact information (including RSA public key) signed by the endorsee's RSA Private Key (RSC); electronic signature of a)+b) indicative of endorsement and preventing endorsee from changing its contact details. It is noted that EDT comprises a list of endorsement objects associated with all previous endorsements.

The endorser further transfers (803) the EDT to a next possessor in a manner detailed with reference to FIG. 7. When endorsee becomes a possessor of EDT, it validates (804) the received EDT. The validation comprises: checking that the EDT is valid and signed by a verified issuer; checking that SRA is valid and has been signed by endorsee; checking that RSC is valid and has been signed by endorsee; checking that the signature has been signed by the endorser; extracting the random address from the SRA and check that duly transferred possession. In the same manner, the endorsee further checks the entire endorsement chain.

Figure 9:
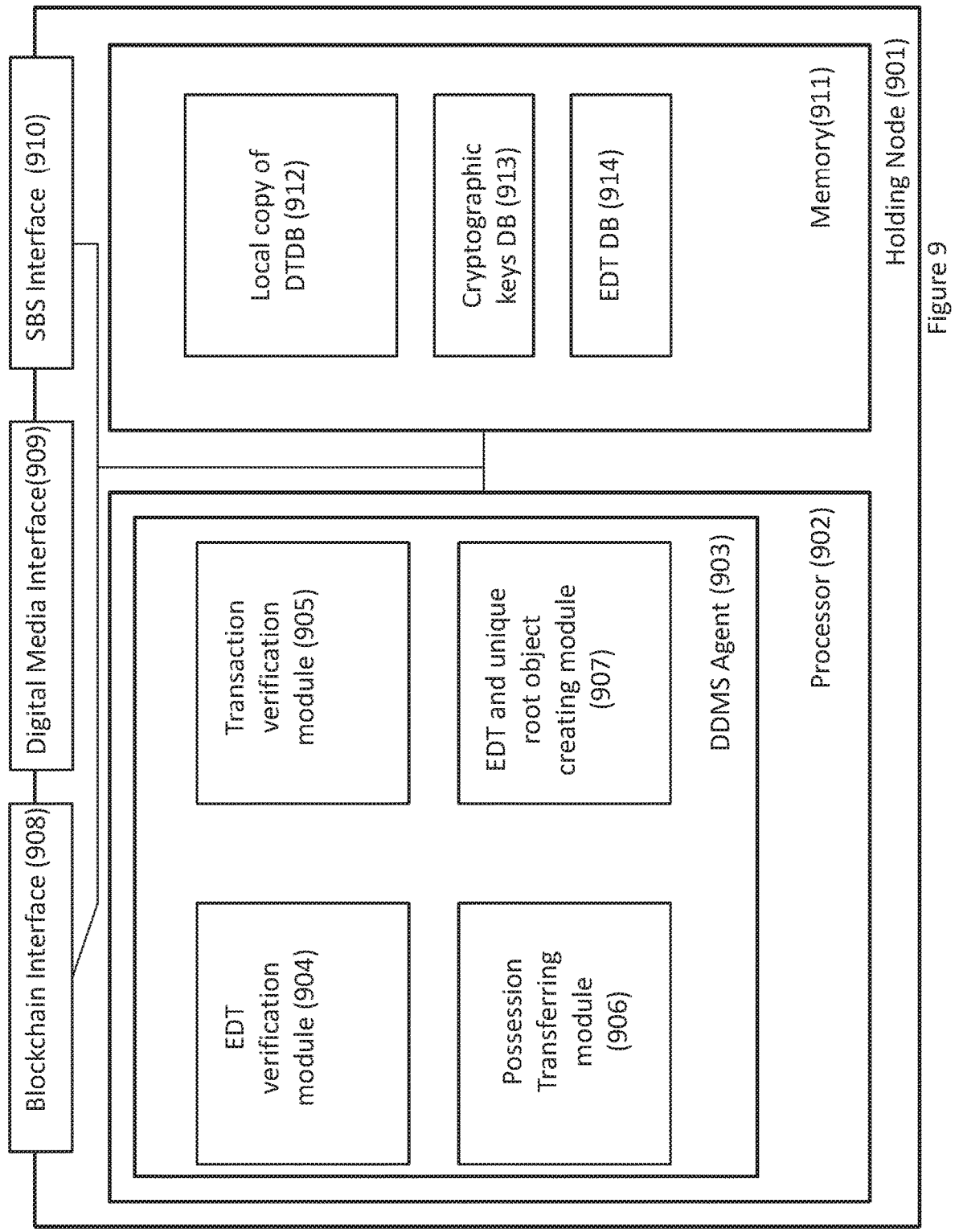
FIG. 9 illustrates a functional block diagram of a holding node in accordance with certain embodiments of the presently disclosed subject matter.

Referring to FIG. 9, there is illustrated a generalized functional block diagram of a holding node in accordance with certain embodiments of the currently presented subject matter.

Holding node 901 comprises processor 902 operatively coupled to memory 911, blockchain interface 908, digital media interface 909 and, optionally, SMS interface 910.

Interfaces 908-910 are communication interfaces configured to enable communication, respectively, with other nodes with regard to blockchain-related transactions, with other nodes for forwarding and receiving EDTs and with SBS. Each interface can comprise (individually or shared with other interfaces) network interface (e.g. Ethernet card), communication port, etc.

Processor 902 is configured to execute DDMS agent 903 and functional modules therein in accordance with computer-readable instructions. These instructions are implemented on non-transitory computer-readable storage medium (memory 911). The agent and functional modules therein are referred to hereinafter as comprised in the processor.

Processor 902 is configured to provide processing necessary for operating the holding node as detailed with reference to FIGS. 2-8. DDMS agent can comprise EDT verification module 904, transaction verification module 905 and possession transferring module 906. DDMS agent running on the issuing node can further comprise EDT and unique root object creating module 907. DDMS agent and the functional modules therein are configured to enable operation of the holding node as detailed with reference to FIGS. 2-8.

Memory 911 further comprises local copy 912 of DTDB, cryptographic keys database 913 and EDT database 914.

It is noted that the teachings of the presently disclosed subject matter are not bound by the holding node illustrated with reference to FIG. 9. Equivalent and/or modified functionality can be consolidated or divided in another manner and can be implemented in any appropriate combination of software with firmware and/or hardware and executed on a suitable device It is to be understood that the invention is not limited in its application to the details set forth in the description contained herein or illustrated in the drawings. The invention is capable of other embodiments and of being practiced and carried out in various ways. It should be noted that the invention is not bound by the specific algorithm of processing or specific structure. Those versed in the art will readily appreciate that the invention is, likewise, applicable to any other processing or presentation with equivalent and/or modified functionality which can be consolidated or divided in another manner.

It will also be understood that the invention further contemplates a machine-readable memory tangibly embodying a program of instructions executable by the machine for executing the method of the invention.

Those skilled in the art will readily appreciate that various modifications and changes can be applied to the embodiments of the invention as hereinbefore described without departing from its scope, defined in and by the appended claims.

The invention claimed is:

1. A method of computerized managing electronic documents of title (EDTs) in a decentralized system comprising a plurality of processor-based holding nodes connected to each other in a peer-to-peer fashion and each maintaining a local copy of at least one decentralized transaction database (DTDB) shared by the holding nodes, the method comprising:
- by an issuing node, generating a root unique object (RUO) associated with the issuing node and usable as a pointer to a blockchain maintained in the DTDB, thereby initiating for a given EDT a possession chain characterized by ID associated with the RUO (RUO_ID);
- by the issuing node, embedding into the given EDT a data object informative of the RUO_ID, and digitally signing the EDT with the embedded data object in a manner enabling an authorized holding node to verify the EDT and to extract the data object, thereby giving rise to a generated electronic document of title (EDT);
- by each holding node currently being in possession of the generated EDT, transferring possession of the generated EDT to a recipient holding node being the next node to become in possession of the generated EDT, the transferring possession comprises:
  - obtaining from the blockchain a first unique object generated by a holding node which has transferred EDT possession to the first holding node;
  - using the first unique object to generate a second unique object which is indicative of the first unique object, specifies the recipient holding node and is includable in the blockchain;
  - enabling including the generated next unique object into the blockchain; and
  - forwarding the generated EDT to the recipient holding node via a digital media; and
- by each holding node, responsive to receiving possession of the generated EDT:
  - validating the received generated EDT;
  - using RUO_ID embedded in the generated EDT to validate possession chain; and
  - transferring possession of the generated EDT to recipient holding node.

2. The method of claim 1, wherein the issuing node generates the root unique object by sending a token to itself, thereby generating a root transaction associated with the issuing node.

3. The method of claim 1, wherein the unique object generated by holding node when transferring EDT possession is a possession transaction with an input referring to the previous possession transaction in the possession chain and with an output indicative of address of recipient holding node.

4. The method of claim 3, wherein enabling including the generated next unique object into the blockchain comprises broadcasting a message informative of the possession transaction to all nodes sharing DTDB.

5. The method of claim 1, wherein validating the possession chain comprises extracting RUO_ID from the EDT and traversing the blockchain to identify, with the help of RUO_ID, the beginning of the possession chain.

6. The method of claim 5, wherein a holding node traverses the blockchain responsive to receiving the generated EDT.

7. The method of claim 1, wherein validating the possession chain comprises querying, by a holding node, the blockchain for transactions associated with RUO_ID and searching within such transactions for indication of respective possessors of the given EDT.

8. The method of claim 1, further comprising triggering by the issuing node an alert indicative of problems related to the given EDT.

9. The method of claim 1, further comprising: by each holding node, prior to transferring possession of the generated EDT to a recipient holding node, obtaining and validating a signed random address (SRA) of the recipient holding node, and transferring possession in accordance with the obtained SRA.

10. The method of claim 9, wherein, by each holding node, forwarding the generated EDT to the recipient holding node comprises using a shared server, the shared server configured such that downloading a given EDT requires knowledge of public key associated with the given EDT, and uploading the given EDT requires proof of ownership of a pairing private key.

11. The method of claim 1, further comprising transferring title specified in the given EDT, the transferring being bound to the possession chain.

12. The method of claim 11, further comprising by each endorser holding node currently being associated with the current owner of title:
- generating and signing an endorsement object, the endorsement object informative of a ID of endorsee holding node associated with the next owner of title);
- adding the generated endorsement object to the generated EDT and signing the EDT together with the added endorsement object, thereby giving rise to an appended EDT; and
- transferring the appended EDT to the endorsee holding node through one or more next recipient holding nodes in the possession chain.

13. The method of claim 12, further comprising by each endorser holding node, prior to generating and signing the endorsement object, obtaining and validating a signed random address (SRA) of the endorsee holding node, and generating the endorsement object using the obtained SRA.

14. The method of claim 1, wherein the DTDB is shared merely by holding nodes comprised in the decentralized system.

15. The method of claim 1, wherein DTDB is shared by holding nodes comprised in the decentralized system and by other nodes.

16. A decentralized system capable of computerized managing electronic documents of title (EDTs), the system comprising a plurality of processor-based holding nodes connected to each other in a peer-to-peer fashion and each maintaining a local copy of at least one decentralized transaction database (DTDB) shared by the holding nodes, the system being configured to:
- generating, by an issuing node, a root unique object (RUO) associated with the issuing node and usable as a pointer to a blockchain maintained in the DTDB, thereby initiating for a given EDT a possession chain characterized by ID associated with the RUO (RUO_ID);
- by the issuing node, embedding into the given EDT a data object informative of the RUO_ID, and digitally signing the EDT with the embedded data object in a manner enabling an authorized holding node to verify the EDT and to extract the data object, thereby giving rise to a generated electronic document of title (EDT);
- by each holding node currently being in possession of the generated EDT, transferring possession of the generated EDT to a recipient holding node being the next node to become in possession of the generated EDT, the transferring possession comprises:
  - obtaining from the blockchain a first unique object generated by a holding node which has transferred EDT possession to the first holding node;

using the first unique object to generate a second unique object which is indicative of the first unique object, specifies the recipient holding node and is includable in the blockchain;

enabling including the generated next unique object into the blockchain; and forwarding the generated EDT to the recipient holding node via a digital media; and by each holding node, responsive to receiving possession of the generated EDT:

validating the received generated EDT;

using RUO_ID embedded in the generated EDT to validate possession chain; and transferring possession of the generated EDT to recipient holding node perform the method stages of claim 1.

17. A computer program product implemented on a non-transitory computer usable medium included in a plurality of processor-based holding nodes and comprising computer readable program code for performing:

generating, by an issuing node, a root unique object (RUO) associated with the issuing node and usable as a pointer to a blockchain maintained in the DTDB, thereby initiating for a given EDT a possession chain characterized by ID associated with the RUO (RUO_ID);

by the issuing node, embedding into the given EDT a data object informative of the RUO_ID, and digitally signing the EDT with the embedded data object in a manner enabling an authorized holding node to verify the EDT and to extract the data object, thereby giving rise to a generated electronic document of title (EDT);

by each holding node currently being in possession of the generated EDT, transferring possession of the generated EDT to a recipient holding node being the next node to become in possession of the generated EDT, the transferring possession comprises:

obtaining from the blockchain a first unique object generated by a holding node which has transferred EDT possession to the first holding node;

using the first unique object to generate a second unique object which is indicative of the first unique object, specifies the recipient holding node and is includable in the blockchain;

enabling including the generated next unique object into the blockchain; and forwarding the generated EDT to the recipient holding node via a digital media; and by each holding node, responsive to receiving possession of the generated EDT:

validating the received generated EDT;

using RUO_ID embedded in the generated EDT to validate possession chain; and transferring possession of the generated EDT to recipient holding node.

* * * * *